United States Patent [19]

Yaeger et al.

[11] Patent Number: 4,490,975

[45] Date of Patent: Jan. 1, 1985

[54] SELF-PROTECTING AND CONDITIONING MEMORY METAL ACTUATOR

[75] Inventors: John R. Yaeger, Sunnyvale; Robert K. Morgan, Pleasant Hill, both of Calif.

[73] Assignee: Raychem Corporation, Menlo Park, Calif.

[21] Appl. No.: 474,931

[22] Filed: Mar. 14, 1983

[51] Int. Cl.[3] .......................... F03G 7/06; H01H 61/04

[52] U.S. Cl. ....................................... 60/527; 337/140

[58] Field of Search ........................ 337/140, 141, 139; 60/527

[56] References Cited

U.S. PATENT DOCUMENTS 3,594,674 7/1971 Willson .............................. 337/140

3,634,803 1/1972 Willson et al. ...................... 337/140

4,275,370 6/1981 Sims .................................. 337/140

*Primary Examiner*—Harold Broome

*Attorney, Agent, or Firm*—Ira D. Blecker; James W. Peterson; Herbert G. Burkhard

[57] ABSTRACT

A shape-memory-effect actuator is provided having a shape-memory-alloy spring and a compensator spring. The alloy spring is operatively connected to a concentrically-mounted compensator spring by the use of a protective support housing which surrounds the alloy spring. The actuator includes a shape-memory-alloy spring and a compensator spring that regulates the operating conditions of the shape-memory-alloy spring to a chosen corresponding memory relaxation curve. The memory relaxation curve defines the actuator's operating stress, stroke and life.

8 Claims, 11 Drawing Figures

F
10
20
22
24
26
28
30
32
34
36
38
40
42
44
12
14
16
18

SELF-PROTECTING AND CONDITIONING MEMORY METAL ACTUATOR

BACKGROUND OF THE INVENTION

The field of this invention involves shape-memory-effect (SME) actuators, and in particular those usages of shape-memory-alloy as they apply to making linear electro-mechanical actuators. Although rotary, torsional and other devices and other configurations are within the scope of the invention, this specification will limit itself to the preferred linear embodiments.

Shape-memory alloys have been used for actuator-type devices previously. Generally, the material is a nickel-titanium alloy called Nitinol or Tinel®, although copper-based alloys have been used in many similar applications. The material has been used for actuators in relays according to Jost (U.S. Pat. No. 3,968,380), Hickling (U.S. Pat. No. 3,849,756), Sims (U.K. Application No. 2,026,246), and Clarke (U.S. Pat. No. 3,872,415). It has been used in temperature-sensing actuators as described by Levinn (U.S. Pat. No. 3,371,247), DuRocher (U.S. Pat. No. 3,707,694 and U.S. Pat. No. 3,676,815), Wilson (U.S. Pat. No. 3,652,969, U.S. Pat. No. 3,634,803 and U.S. Pat. No. 3,594,674U), and Melton (U.S. Pat. No. 4,205,293). An SME valve actuator has been described by Wilson (U.S. Pat. No. 3,613,732).

*Tinel is a Registered Trademark of Raychem Corporation.

Clark (U.S. Pat. No. 3,948,688) describes a technique for conditioning and improving the fatigue life of a shape-memory alloy by thermally cycling the material while "the alloy is maintained under a tensile stress sufficient to strain it beyond its plastic yield point " (see Abstract). This technique is described as improving the alloy characteristics before it is designed into a device, whereas the current invention is intended to ensure that the alloy does not exceed its design criteria via some unpredicted force and suffer damage which will limit its useful life to a value shorter than that for which it was intended.

A similar arrangement is taught by Sims (U.K. Application No. 2,026,246) wherein a compression accessory spring biases a shape-memory-alloy spring in tension (see page 2, lines 1-10).

Hickling (U.S. Pat. No. 3,849,756) teaches the use of an accessory spring both for moving SME actuators "back to the undeformed state" (that is, a return or reset spring) (see Col. 9, lines 37-40) and also for a tensioning or bias spring to keep a "structural member . . . in that position" (see Col. 9, lines 14-18).

Levinn (U.S. Pat. No. 3,731,247) uses accessory springs both as a return or reset spring as previously described and also as a means for limiting the movement of a wire of shape-memory alloy. In this case, a straight wire is heated over only a part of its length. The movement or recovery upon heating over that fraction of the total length is sufficient to actuate a switch. The wire may, however, be heated over a longer length (as anticipated by the design) than required to just throw the switch. The accessory spring in series with the wire is used to limit the movement of the wire to only that amount necessary to throw the switch. In so doing, it assures that "no damage will be done to the system". The instant invention differs in several respects from this. First, the instant invention attempts to protect an actuator against unexpected, not anticipated, events that could cause damage. Second, because the current invention is connected, in the usual embodiment, to another mechanism, it similarly protects againt damage to that outside mechanism as well as damage to itself. Third, the use of an accessory spring in series with the shape-memory-alloy spring could make the device sufficiently long as to make it impractical. The instant invention utilizes a coaxial embodiment which minimizes the length of the device and therefore conserves space. Fourth, the alloy spring of the current invention is designed to recover completely, not partially.

SUMMARY OF THE INVENTION

The purpose of this invention is to provide a shape-memory-effect actuator which (1) is protected against unexpected and unforeseen damage and/or abuse, (2) protects any mechanism to which the actuator is attached from damage by the actuator in the event of a jam or other mishap which tries to prevent the mechanism from moving, (3) regulates the shape-memory-alloy spring of the actuator for a significantly larger number of operating cycles than would be possible without the invention, (4) insures more constant and reliable operation by protecting the shape-memory-alloy spring of the actuator from the environment, and (5) accomplishes all of the above in the smallest amount of space.

To accomplish this purpose the instant invention provides a shape-memory-effect actuator having a shape-memory alloy spring, the spring being operatively connected to a concentrically-mounted compensator spring by the use of a protective support housing which surrounds the alloy spring. The compensator spring regulates the operating conditions of the shape-memory-alloy spring to its memory relaxation curve, the curve defining the number of life cycles, the operating stress and the stroke of the actuator.

One aspect of this invention resides in an actuator comprising:

a shape-memory-alloy spring having first and second ends;

a first actuator termination connected to the second end of the alloy spring;

a compensator spring having first and second ends, said compensator spring being concentrically mounted with respect to said alloy spring;

a protective support housing surrounding the alloy spring, the housing operatively interconnecting the second end of the compensator spring to the first end of the alloy spring; and a second actuator termination connected to the first end of the compensator spring.

Another aspect of this invention resides in an actuator having a desired designed stroke, number of life cycles and output force, the actuator comprising:

a shape-memory-alloy spring characterized by a memory relaxation curve which defines an inherent stroke, an operating stress and the same number of life cycles as the actuator; and a compensator spring operatively connected in series to said shape-memory-alloy spring, the compensator spring having a stroke equal to or greater than the difference between the inherent shape-memory-alloy spring stroke at one cycle at constant stress and the stroke of the actuator at the design number of life cycles at the same constant stress, the compensator spring having an initial tension equal to or slightly greater than the actuator design output force, the compensator spring capable of exerting a maximum force proportional to the design stress of the shape-memory-alloy spring at the actuator design life cycles, the compensator spring regulating the operating conditions of the shape-memory-alloy spring to the alloy spring's memory relaxation curve.

BRIEF DESCRIPTION OF THE DRAWINGS

FIG. 6 shows the test spring with no current or heat being applied and the test spring extended to a fixed amount.

FIG. 7 is the same as FIG. 6 with current applied to the test spring to heat it and thus effect the memory so as to lift the weight.

FIG. 8 is the same as FIG. 7 except that an unexpected restriction restrains the recovery of the test spring.

DESCRIPTION OF THE PREFERRED EMBODIMENT

Figure 1:
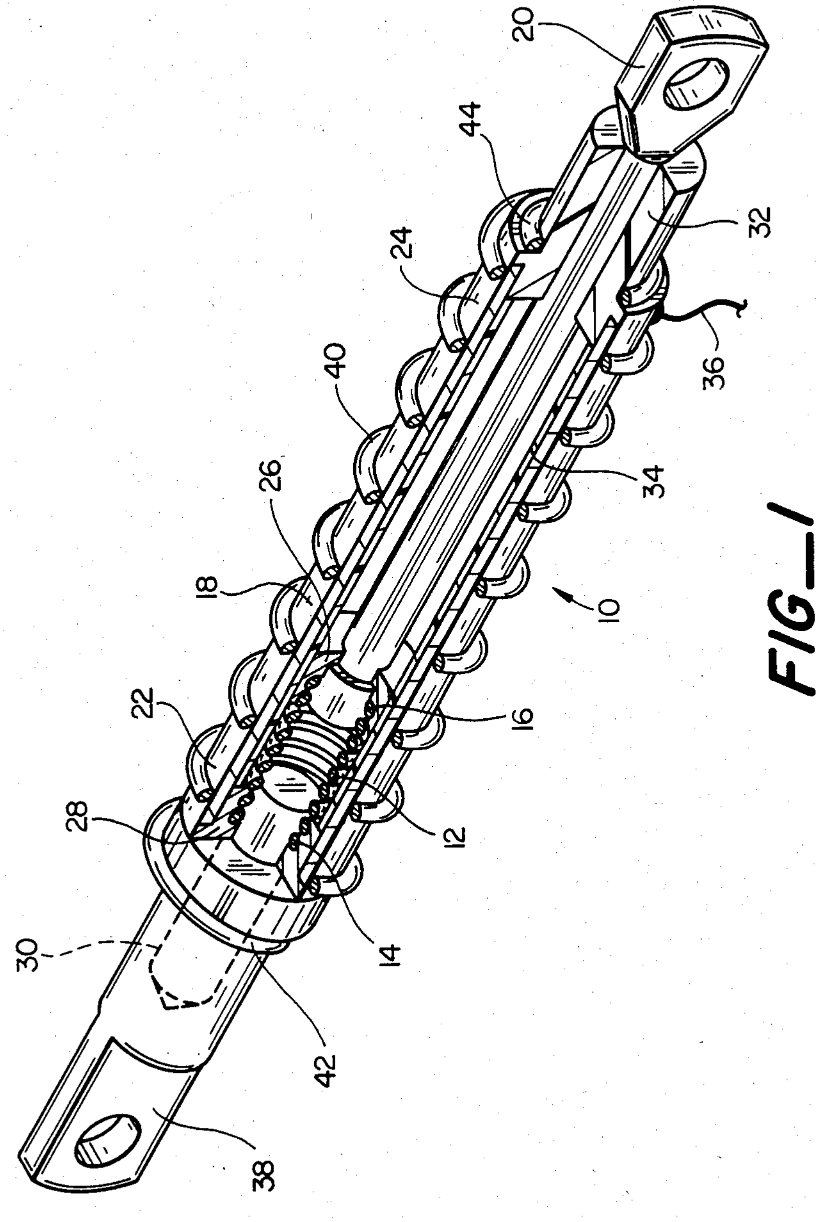
FIG. 1 is a partially sectioned perspective view of the SME actuator of the instant invention.

With reference to FIG. 1, the SME actuator is shown generally at 10. Actuator 10 includes a shape-memory-alloy spring 12 having first and second ends 14 and 16, respectively. The alloy spring 12 is electrically and mechanically secured to a protective support housing 18 and to a first actuator termination 20. Protective support housing 18 having first and second ends 22 and 24, respectively, is connected at its first end 22 to first end 14 of alloy spring 12 and generally surrounds alloy spring 12, as will be discussed later. The second end 16 of alloy spring 12 is connected to first actuator termination 20 via a crimp technique whereby a first terminator 26, made of a low-yield strength material such as an annealed copper, is crimped over the end 16 of the alloy spring 12 which is backed up by first actuator termination 20. Other techniques such as soldering, brazing, welding, etc., for terminating the alloy spring 12 are within the scope of the invention.

The first end 14 of the alloy spring 12 is similarly secured between second terminator 28 and a guide pin support 30. Terminator 28 is securely fastened to the first end 22 of the protective support housing 18. This connection to the protective support housing 18 should be press-fit, soldered, brazed, welded, etc., to ensure both a good electrical and mechanical connection.

The second end 24 of protective support housing 18 includes an insulating support 32 which is made of an insulating material such as plastic, ceramic, etc., which electrically insulates the actuator termination 20 from the protective support housing 18. Actuator termination 20 has a smooth sliding fit within insulating support 32.

An electrically insulating sleeve 34 made of such material as plastic or ceramic is mounted inside protective support housing 18 and surrounds the alloy spring 12 and the first terminator 26 to prevent both of these items from making electrical contact with the protective support housing 18. The insulating sleeve 34 may also provide some thermal insulation.

As discussed earlier, second terminator 28 is electrically and mechanically connected to the protective support housing 18. Electrical lead 36 is electrically and mechanically connected to protective support housing 18. This means that electrical lead 36, protective support housing 18, second terminator 28, alloy spring 12, first terminator 26 and actuator termination 20 are electrically connected in series. This series relationship allows current to be passed through alloy spring 12 to heat and recover alloy spring 12. Actuator termination 20 is, therefore, used for purposes of electrical and mechanical connection as will be discussed later.

Figures 2, 3, 4:
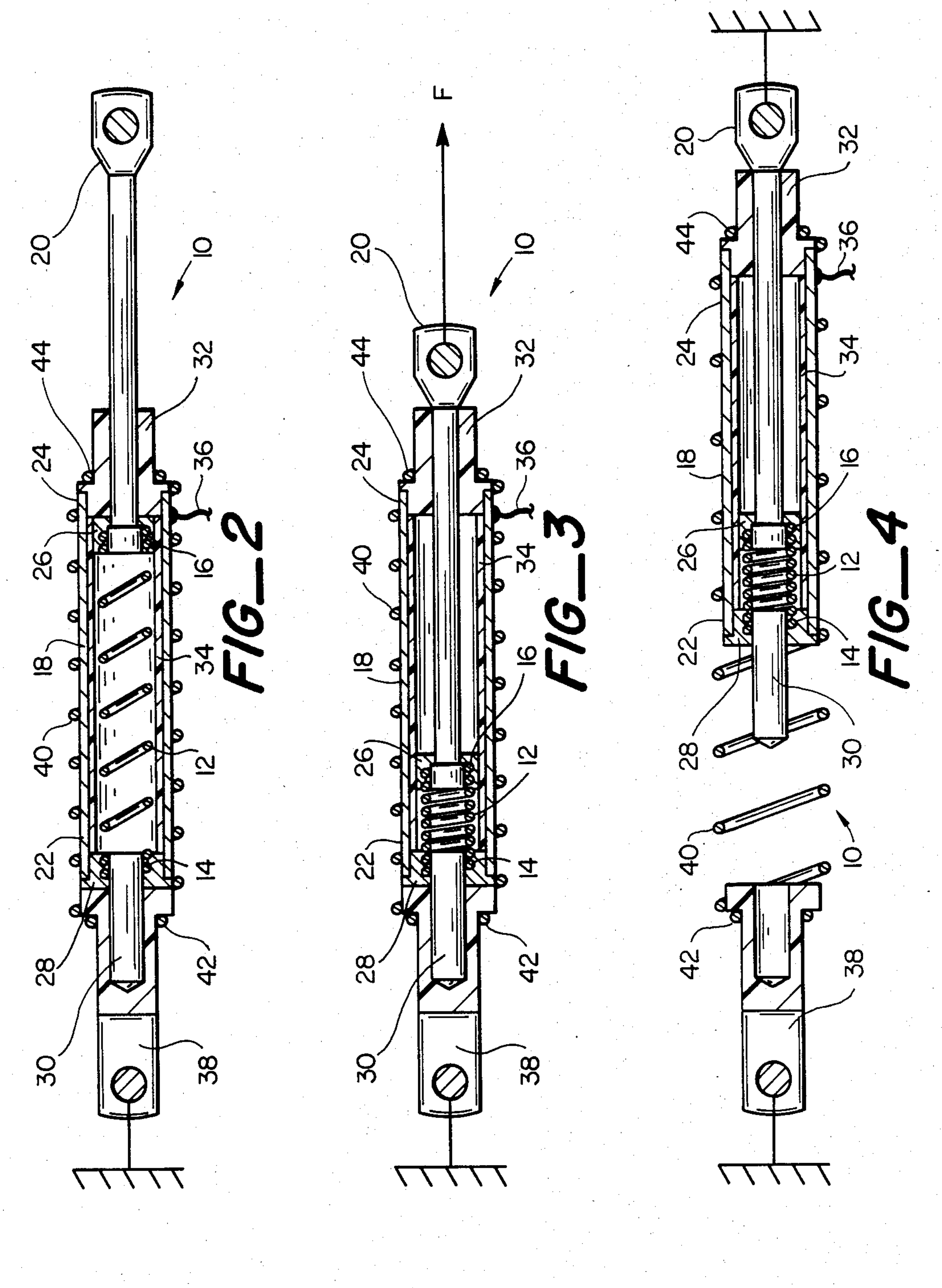
FIG. 2 is a cross-sectional view of the actuator in the extended (non-actuated) state and under no load.
FIG. 3 is the same as FIG. 2, but shows the actuator in the closed (actuated) state and under normal loads.
FIG. 4 is the same as FIG. 3, but wherein the actuator has been subjected to an unexpected restraint applied to the actuator.

Second actuator termination 38 is held tightly against the end of second terminator 28 by the compensator spring 40. As can be seen in FIGS. 2–4, second terminator 28 is secured, such as by crimping, to the guide pin support 30, which slidingly fits within a complementary opening in second actuator termination 38. The complementary portion or protrusion of the pin support 30 is for alignment purposes and is not essential, i.e., it may be excluded. The compensator spring 40 has one or more turns on each end that are smaller in diameter than the outside of the protective support housing 18. The first and second ends 42 and 44, respectively, of the compensator spring 40 fit respectively over actuator termination 38 and insulating support 32. Compensator spring 40 is in tension in order to hold the entire assembly in compression. The attachment of the compensator spring 40 to actuator termination 38 and insulating support 32 by other known mechanical means is within the scope of the invention.

Spring 12 is formed from shape-memory alloy. Shape-memory alloys are disclosed in U.S. Pat. No. 3,012,882 and U.S. Pat. No. 3,174,851, and Belgian Pat. No. 703,649, the disclosures of which are incorporated by reference herein. As made clear in these patents, these alloys undergo a transition between an austenitic state and a martensitic state at certain temperatures. When they are deformed while they are in the martensitic state, they will retain this deformation while maintained in this state, but will revert to their original configuration when they are heated to a temperature at which they transform to their austenitic state. This ability to recover upon warming has been utilized in commonly-assigned U.S. Pat. Nos. 4,035,007 and 4,198,081, which are also incorporated by reference herein. The temperatures at which these transitions occur are affected, of course, by the nature of the alloy. A shape- memory-alloy from which the alloy spring 12 may be fabricated is the titanium/nickel/copper alloy disclosed in the copending and commonly assigned U.S. patent application Ser. No. 355,274, filed Mar. 5, 1982, which is incorporated herein by reference.

Since the shape-memory-alloy spring 12 is fundamentally actuated by heat, externally or internally generated (as by passing current through the alloy spring 12), its performance is highly susceptible to the environment, and it is therefore desirable to maintain this environment as constant and as predictable as possible. In particular, if the SME actuator 10 is subjected to wind, water and other ambient conditions, there may be sufficient cooling effect to prevent the shape-memory-alloy spring 12 from reaching its transformation temperature. By enclosing the shape-memory-alloy spring 12 within the protective support housing 18, adverse effects from unpredicted environmental changes are largely prevented. Protective support housing 18 also functions to operatively interconnect the second end 44 of the concentrically-mounted compensator spring 40 to the first end 14 of the alloy spring 12. It is important to note that it is within the scope of the invention to mount the compensator spring concentrically within (not shown) the shape-memory-alloy spring and the protective support housing as long as the mechanical and electrical relationships of the various components are maintained.

FIG. 2 illustrates the SME actuator 10 in the extended (non-actuated) state and under no load. Actuator termination 38 is shown symbolically to be solidly attached to a fixed anchor via attaching means such as a bolt through the hole in the actuator termination 38. Electrical lead 36 and actuator termination 20 may be connected to an electric current source, such that electric current passes through the shape-memory-alloy spring 12 via electrical lead 36 and actuator termination 20. The electric current is sufficiently large to heat the alloy spring 12 above its transformation temperature, thus recovering (shrinking) it in length to its memory state, thereby exerting a force on actuator termination 20. If the force F shown in FIG. 3, which is restraining actuator termination 20, is less than the recovery force exerted by the alloy spring 12, then the actuator termination 20 will move inward as shown in FIG. 3. In this case, the compensator spring 40 does not extend (stretch), since it is designed to have an initial tension which is equal to or slightly greater than the actuator design output force.

Consider, however, FIG. 4, where the first actuator termination 20 has been firmly attached to an immovable anchor. Such an event might occur when the mechanism to which the SME actuator 10 is attached jams or otherwise becomes immovable. In such a situation it is desirable to prevent damage to the shape-memory-alloy spring 12 and/or the mechanism to which the actuator 10 is attached, in the event that the actuator is stronger than the mechanism. When this condition occurs, the compensator spring 40 begins to extend as soon as the force exerted by the alloy spring 12 exceeds the initial tension of the compensator spring.

When heated, the shape-memory spring 12 will always be able to return to its closed (actuated) position despite any external interruption of the actuator stroke. The disparity between the interrupted stroke and a full normal stroke is offset by deflection of the compensator spring.

The design of compensator spring 40 is critical to the protection of both the SME actuator 10 and any mechanism to which actuator 10 is attached. Details of spring design follow well-established techniques as found in a number of texts and references. Criteria for designing the compensator spring 40 in relation to the shape-memory-alloy spring 12, however, are unique to this invention and require explanation.

Before the details of the compensator spring design are considered, it is necessary to understand the effects of repeated cycling of the shape-memory-alloy spring 12 under a load. For simplicity, we shall consider a constant load and data accumulated by using the simple test apparatus shown in FIGS. 6–8.

Figures 6, 7, 8:
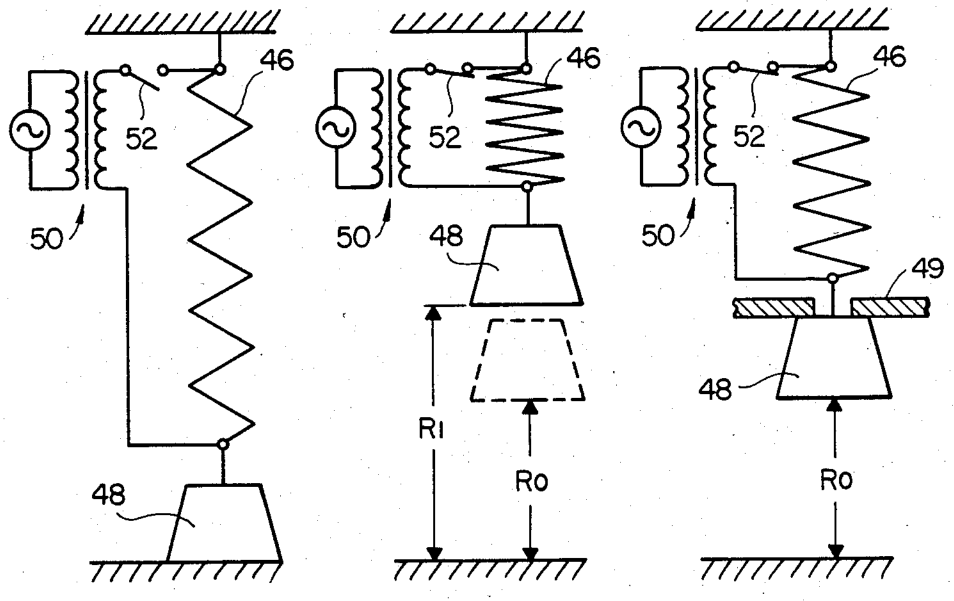
FIG. 6, 7 and 8 show the type of test apparatus used for accumulating the data of FIG. 5, where

Test spring 46 is made of shape-memory alloy which is martensitic at room temperature and annealed to have a memory state in the close-wound or shortest length. When a test weight 48 is attached to the test spring 46 and when that weight is larger than the strength of the spring in its martensitic state, the test spring 46 will be stretched (elongated) until, in this case, the weight comes to rest, as shown in FIG. 6. Upon heating the test spring 46 with heating circuit 50, the test spring lifts the test weight 48 and recovers to its memory position. When done slowly, the stress $S_1$ exerted by load $P_1$ on the test spring 46 is constant and can be simply expressed by the equation $$S_1=(8P_1D/T\pi d^3) \quad (1)$$

where

D = mean diameter of the spring d = wire diameter

Equation (1) ignores detailed correction factors (e.g. Wahl) when they are applicable and assumes small excursions, but is adequate for describing the phenomena necessary to explain the compensator spring design.

Figure 5:
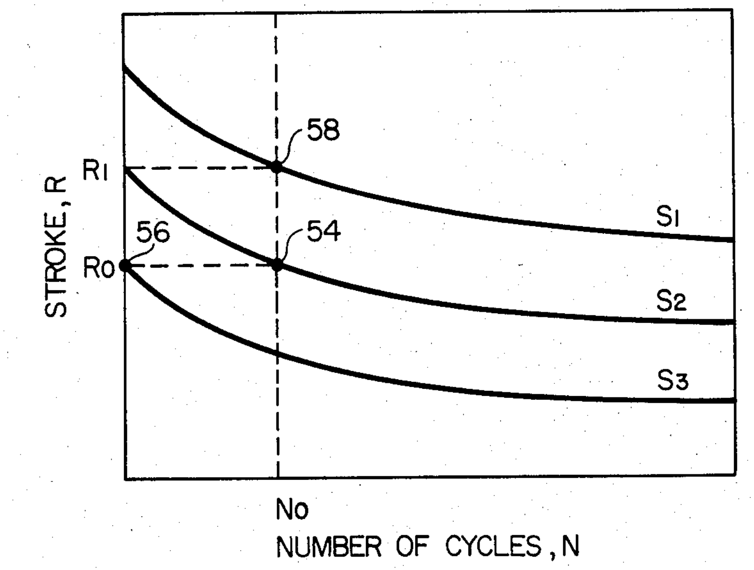
FIG. 5 is a memory relaxation curve graph showing the loss of effective memory performance of a shape-memory-alloy spring when subjected to varying stress levels.

When the test circuit is turned on and off via the switch 52, the test apparatus will alternate between the conditions shown in FIGS. 6 and 7. The amount of stroke R shown in FIG. 7 will lessen as the number of cycles N increases. This effect is shown in the memory relaxation curve, FIG. 5, for three different stresses, $S_1$, $S_2$, $S_3$, where $S_1<S_2<S_3$, which are obtained by either changing the load or the dimensions of the test spring per Equation (1). At constant stress $S_2$, the stroke as shown in FIG. 5 decreases from an initial value $R_1$ to a value $R_0$ occurring at $N_0$ cycles. For the sake of this discussion on compensator spring design, we will assume that the shape-memory-alloy spring dimensions remain constant and only the load is changed to accumulate data typical of FIG. 5. This apparent loss of memory is believed to be the result of the work-hardening of the test spring 46 due to cycling. The work-hardened spring opposes the amount of stroke R possible. Thus it can be seen that the shape-memory-alloy spring can be characterized with regard to stroke, number of life cycles and operating stress by the memory relaxation curve.

When designing an actuator, the shape-memory-alloy spring must accommodate the memory relaxation curve of FIG. 5 in terms of the desired design stroke for a desired number of design cycles and a desired stress under normal working conditions. As an example, consider the design point 54 in FIG. 5 which shows an alloy design stroke equal to $R_0$, subjected to a design stress $S_2$ for $N_0$ number of design cycles. For all cycles <u>less</u> than $N_0$, the alloy spring is capable of delivering <u>a</u> stroke greater than $R_0$ at the design stress $S_2$. The stroke could also be increased without sacrifice in the design number of cycles by lowering the stress. For example, point 58 describes a design wherein you retain the number of cycles $N_0$ and increase the stroke to a value $R_1$, while diminishing the design stress to $S_1$. Conversely, if the stroke is restricted to $R_0$ at some cycle prior to $N_0$, then the shape-memory spring will have been subjected to a stress higher than $S_2$. This condition can be simulated as seen in FIG. 8 by utilizing a barrier 49. When this barrier is inserted, the resulting increased stress $S_3$ resulting from restricting the stroke to $R_0$ at cycles less than $N_0$ reduces the number of life cycles at which stroke $R_0$ is delivered. Many actuator applications require a fixed length stroke and are therefore faced with this over-stress potential problem.

The solution to the above problem is to incorporate a compensator spring in series with the shape-memory-alloy spring such that the shape-memory-alloy spring is allowed to recover to its full capability.

In the design of the compensator spring 40, an operating point 58 is selected at a reduced stress $S_1$ in FIG. 5 such that the additional or differential stress $S_d$ exerted by the compensator spring 40 on the shape-memory-alloy spring 12 satisfies the following condition:

$$S_d + S_1 \leqq S_2 \quad (2)$$

$$S_d \leqq S_2 - S_1$$

The compensator spring 40 allows the shape-memory-alloy spring 12 to move an additional length $(R_1 - R_0)$ even though the entire actuator mechanism moves only the design length $R_0$.

Combining Equations (1) and (2) will define a maximum value for the differential load $P_d$ that the compensator spring 40 exerts.

$$P_d = \frac{\pi d_a^3 (S_2 - S_1)}{8D_a} = \frac{\pi d_a^3 S_d}{8D_a} \quad (3)$$

where $d_a$, $S_2$, $S_1$ and $D_a$ are for the shape-memory-alloy spring 12.

Note that the maximum load the compensating spring 40 exerts, $P_{max}$, is given by $$P_{max} = \frac{\pi d_a^3 S_2}{8D_a} \quad (4)$$

and the initial tension of the compensating spring $P_{initial}$ is given by $$P_{initial} = \frac{\pi d_a^3 S_1}{8D_a} \quad (5)$$

The spring rate $K_0$ for the compensating spring can now be determined from the differential load $P_d$ and the deflection of the compensator spring, $R_d = R_1 - R_0$.

$$K_0 = \frac{P_d}{R_d} = \frac{P_{max} - P_{initial}}{R_1 - R_0} \quad (6)$$

Dimensions for the compensator spring 40 may now be determined using Equation (6) and the definition of the spring rate, $K_0$.

$$K_0 = \frac{d_c^4 G}{9ND_c^3} \quad (7)$$

where

G = torsional modulus of the compensator spring, psi
N = number of active compensator spring coils
$d_c$ = wire diameter of compensator spring, inches
$D_c$ = mean diameter of compensator spring coils, inches.

As a summary, the compensator spring 40 is designed by the following steps:

A. Determine the differential stroke $R_d = R_1 - R_0$
B. Determine the differential load $P_d = P_{max} - P_{initial}$
C. Determine the initial tension $P_{initial}$ of the compensator spring from Equation (5).
D. Determine the compensator spring rate $K_0$ from Equation (6).
E. Determine the compensator spring dimensions from Equation (7).

The instant invention in its most general terms is then the combination of a shape-memory-alloy spring 12 and an compensator spring 40 wherein a shape-memory-effect actuator having a desired design stroke, number of design cycles and output force comprises:

a shape-memory-alloy spring characterized by a memory relaxation curve which defines an inherent stroke, an operating stress and the same number of life cycles as the actuator; and a compensator spring operatively connected in series to said shape-memory-alloy spring, the compensator spring having a stroke equal to or greater than the difference between the inherent shape-memory-alloy spring stroke at one cycle at constant stress and the stroke of the actuator at the design number of life cycles at the same constant stress, the compensator spring having an initial tension equal to or slightly greater than the actuator design output force, the compensator spring capable of exerting a maximum force proportional to the design stress of the shape-memory-alloy spring at the actuator design life cycles, the compensator spring regulating the operating conditions of the shape-memory-alloy spring to the alloy spring's memory relaxation curve.

Figures 9, 10, 11:
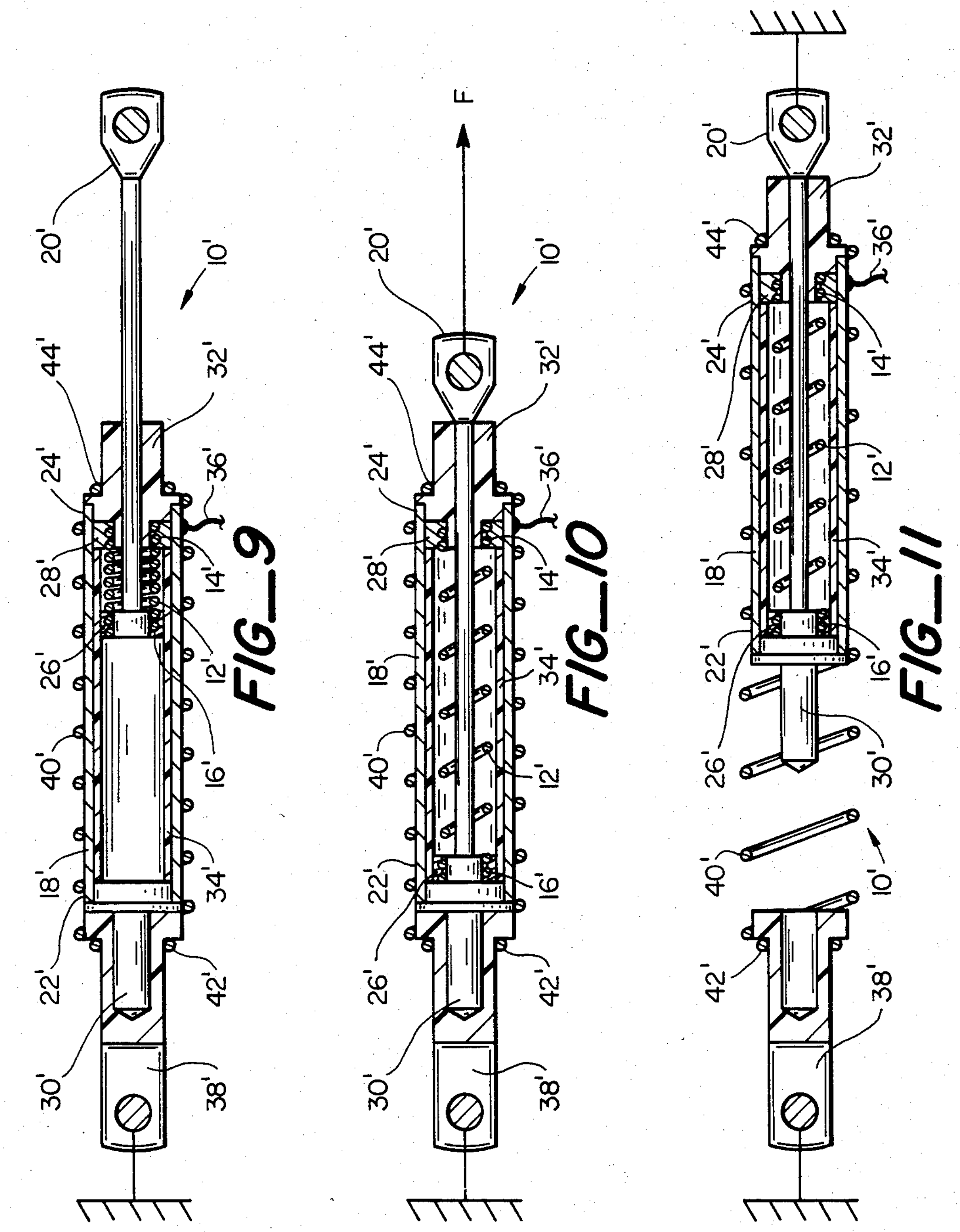
FIG. 9 is a cross-sectional view of an alternate embodiment of the instant invention with the actuator in the extended (non-actuated) state and under no load.
FIG. 10 is the same as FIG. 9, but shows the actuator in the closed (actuated) state and under normal loads.
FIG. 11 is the same as FIG. 10, but wherein the actuator has been subjected to an unexpected restraint applied to the actuator.

The preferred embodiment of the instant invention shown and discussed with respect to FIGS. 1–4 utilizes a shape-memory-alloy spring which goes from an extended (non-actuated) state to a closed (actuated) state. FIGS. 9–11 show an alternate embodiment of the instant invention wherein a shape-memory-alloy spring 12′ goes from a closed (non-actuated) state to an extended (actuated) state. The embodiment of FIGS. 1–4 utilizes a shape-memory-alloy spring which contracts when it recovers. The embodiment of FIGS. 9–11 utilizes a shape-memory-alloy spring which expands when it recovers.

FIG. 9 discloses the alternate embodiment wherein SME spring actuator 10′ is in the relaxed, reset or ready condition. First actuator termination 20′ is slidingly mounted with respect to insulating support 32′ and is connected at the far end thereof to shape-memory-alloy spring 12′ having a first end 14′ and a second end 16′. The interconnection of first actuator termination 20′ and alloy spring 12′ is accomplished by first terminator 26′ which is crimped over second end 16′. The first end 14′ of alloy spring 12′ is connected to insulating support 32′ by a second terminator 28′. As discussed with respect to the earlier embodiment, other forms of alloy spring termination are within the scope of the instant invention.

Insulating sleeve 34′ covers first terminator 26′ and all but end 14′ of alloy spring 12′. First electrical lead 36′ is electrically connected to protective support housing 18′, which is in turn electrically interconnected via second terminator 28′ to shape-memory-alloy spring 12′. Alloy spring 12′ is electrically interconnected via first terminator 26′ to first actuator termination 20′. The electrical circuit for providing current to alloy spring 12' is thus effected. It is important to note that in this embodiment guide pin support 30' must be made of electrically insulating material to prevent electrical shorting in the actuated mode shown in FIG. 10. Again, the protruding portion of guide pin support 30' may be omitted.

The operation of SME actuator 10' is substantially identical to the operation disclosed with respect to the actuator in FIGS. 1-4. Electric current passes through alloy spring 12' to heat the alloy spring 12' above its transformation temperature, whereupon it recovers (expands) to its memory state, thereby exerting a force on first actuator termination 20'. If the design force F shown in FIG. 10, which is restraining first actuator termination 20', is less than the recovery force exerted by alloy spring 12', then the first actuator termination 20' will move inward as shown in FIG. 10. The compensator spring 40' is designed to have an initial tension which is equal to or greater than the maximum design force, and therefore does not extend (stretch) under normal expected design loads. FIG. 11, much like FIG. 4, discloses an event in which the mechanism to which the actuator is attached jams or otherwise becomes immovable. Under this condition, as shown in FIG. 11, it is desirable to prevent damage to the SME actuator 10', or to the mechanism to which the actuator is attached in the event the actuator is stronger than the mechanism. When this condition occurs, the compensator spring 40' begins to extend as soon as the force exerted by the alloy spring 12' against the actuator termination 20' exceeds the initial tension of the compensator spring. The alloy spring 12' is allowed to recover to its memory state (open), thereby preventing damage to itself. Damage to any mechanism attached to the actuator is also prevented due to the extension of and unloading by the compensator spring 40'.

The above-described embodiments are specific to actuators that become dimensionally shorter under actuation. It is within the scope of the invention to configure actuators that become longer upon actuation (not shown), as long as the compensator spring regulates the operating conditions of the shape-memory-alloy spring to a chosen corresponding memory relaxation curve.

From the foregoing detailed description, it is evident that there are a number of changes, adaptations and modifications of the present invention which come within the province of those skilled in the art. However, it is intended that all such variations not departing from the spirit of the invention be considered as within the scope thereof as limited solely by the appended claims.

What is claimed is:

1. A shape-memory-effect actuator comprising:

a shape-memory-alloy spring having first and second ends; a first actuator termination connected to the second end of the alloy spring;

a compensator spring having first and second ends, said compensator spring being concentrically mounted with respect to said alloy spring:

a protective support housing surrounding the alloy spring, the housing operatively inteconnecting the second end of the compensator spring to the first end of the alloy spring;

said compensator spring and said alloy spring acting in series; and a second actuator termination connected to the first end of the compensator spring.

2. An actuator as in claim 1 wherein the first actuator termination, the alloy spring, and the protective support housing are electrically interconnected in series, said alloy spring being capable of shape-memory recovery when electrical current is passed through the alloy spring via the first actuator termination and to the protective support housing.

3. The actuator of claim 1 wherein the alloy spring expands upon recovery.

4. The actuator of claim 2 wherein the alloy spring expands upon recovery.

5. The actuator of claim 1 wherein the alloy spring contracts upon recovery.

6. The actuator of claim 2 wherein the alloy spring contracts upon recovery.

7. A shape-memory-effect actuator having a desired design stroke, number of design cycles and output force, the actuator comprising:

a shape-memory-alloy spring characterized by a memory relaxation curve to define an inherent stroke, an operating stress and the same number of life cycles as the actuator; and a compensator spring operatively connected in series to said shape-memory-alloy spring, the compensator spring having a stroke equal to or greater than the difference between the inherent shape-memory-alloy spring stroke at one cycle at constant stress and the stroke of the actuator at the design number of life cycles at the same constant stress, the compensator spring having an initial tension equal to or slightly greater than the actuator design output force, the compensator spring capable of exerting a maximum force proportional to the design stress of the shape-memory-alloy spring at the actuator design life cycles, the compensator spring regulating the operating conditions of the shape-memory-alloy spring to the alloy springs's memory relaxation curve.

8. The actuator of claim 7 wherein the shape-memory-alloy spring being capable of shape-memory recovery when electrical current is passed through the alloy spring.

* * * * *